(12) United States Patent
Lambert

(10) Patent No.: US 10,118,455 B1
(45) Date of Patent: Nov. 6, 2018

(54) PASSIVE SUSPENSION RIDE HEIGHT ADJUSTMENT METHOD

(71) Applicant: Adam Thomas Lambert, Reading, PA (US)

(72) Inventor: Adam Thomas Lambert, Reading, PA (US)

( * ) Notice: Subject to any disclaimer, the term of this patent is extended or adjusted under 35 U.S.C. 154(b) by 0 days.

(21) Appl. No.: 15/238,123

(22) Filed: Aug. 16, 2016

(51) Int. Cl.
*B60G 15/06* (2006.01)
*B60G 17/018* (2006.01)
*B62D 35/00* (2006.01)

(52) U.S. Cl.
CPC ....... *B60G 17/0182* (2013.01); *B60G 15/061* (2013.01); *B60G 2500/30* (2013.01); *B62D 35/00* (2013.01)

(58) Field of Classification Search
CPC .. B60G 15/061; B60G 2500/30; B60G 11/14; B60G 17/021; B60G 2204/124; B60G 2204/12422
See application file for complete search history.

(56) References Cited

U.S. PATENT DOCUMENTS

| | | | | |
|---|---|---|---|---|
| 3,603,610 | A * | 9/1971 | Thompson | B60G 11/16 267/221 |
| 6,102,378 | A * | 8/2000 | Gieseler | B60G 17/0485 105/453 |
| 7,135,794 | B2 * | 11/2006 | Kuhnel | B60G 11/16 310/12.14 |
| 7,874,561 | B2 * | 1/2011 | Michel | B60G 17/021 280/6.157 |
| 8,844,943 | B2 * | 9/2014 | Kim | B60G 17/0157 280/5.514 |
| 2012/0068436 | A1 * | 3/2012 | Powell | B62K 25/08 280/283 |
| 2013/0221626 | A1 * | 8/2013 | Lee | B60G 17/08 280/5.514 |
| 2017/0174035 | A1 * | 6/2017 | Lee | B60G 17/052 |

* cited by examiner

*Primary Examiner* — James A English
(74) *Attorney, Agent, or Firm* — Eckert Seamans Cherin & Mellott, LLC; Stephen A. Bucchianeri

(57) ABSTRACT

A passive ride height adjuster mechanism includes a piston and cylinder acting on a main suspension spring at one or more locations around the chassis of a race car; with the piston-cylinder having adjustable length or travel; a hydraulic or pneumatic pressurization system mounted in the chassis is connected to the piston-cylinder; a signal from a timer or sensor on the chassis that signals the pressurization or depressurization of the piston-cylinder which affects the chassis ride height.

13 Claims, 3 Drawing Sheets

PASSIVE SUSPENSION RIDE HEIGHT ADJUSTMENT METHOD

BACKGROUND

Field

The present invention relates generally to suspension systems for use in racing applications and, more particularly, to systems which provide for the passive adjustment of the ride height. The present invention further relates to methods for passively adjusting the ride height.

Background Information

Racing suspension technology has been advancing at a steady pace for decades, often taking leaps instead of incremental steps when a new device is created such as the one presented here. Typically the drag racer's chassis ride height is set as a compromise to benefit low speed traction and high speed aerodynamic efficiency. Until now, there was no mechanism that could dynamically change the chassis ride height on track with no driver input. The present invention was created to assist drag cars in a way that enhances traction at lower vehicle speeds and then gets the chassis out of the air by lowering the drag car at higher speeds down track to reduce aerodynamic drag.

Devices exist that use airbags or similar arrangements with pressurized air chambers. These devices are typically manually activated (an active system) via a switch to raise or lower the vehicle for the purpose of avoiding damage to the lowered car on speed bumps, curbs/driveways, etc. and generally have an adverse effect on the basic functioning of the suspension of the vehicle.

There is, therefore, room for improvement in systems and methods for adjusting the ride height of a vehicle.

SUMMARY

The present invention is a hydraulic or pneumatic device with a piston in a cylinder that is mounted between the sprung and unsprung masses of a race car. The device typically is installed on the shock absorber and above or below the main suspension spring and functions generally as an adjustable spacer. The main suspension spring is typically in direct contact with the piston and can fit inside the cylinder when the cylinder is in its depressurized state.

In its pressurized state (i.e.—high ride height setting) there is pressure in the device and the piston is forced to the top of cylinder against a hard stop. The hard stop position may be adjustable and the pressure is sufficient enough so as to not contribute to the spring rate of the suspension.

In its depressurized state (i.e.—low ride height setting) there is no pressure in the device and the piston is bottomed out. The spring is typically inside the cylinder at this point and the suspension has been lowered by the distance equal to the vertical displacement of the piston.

The change in pressure inside the device is typically triggered by a timer which sends a signal to open a valve to release the pressure. This electrical signal can also be triggered by a sensor on the chassis, suspension, ECU, and driver. The rate of depressurization can be tunable.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
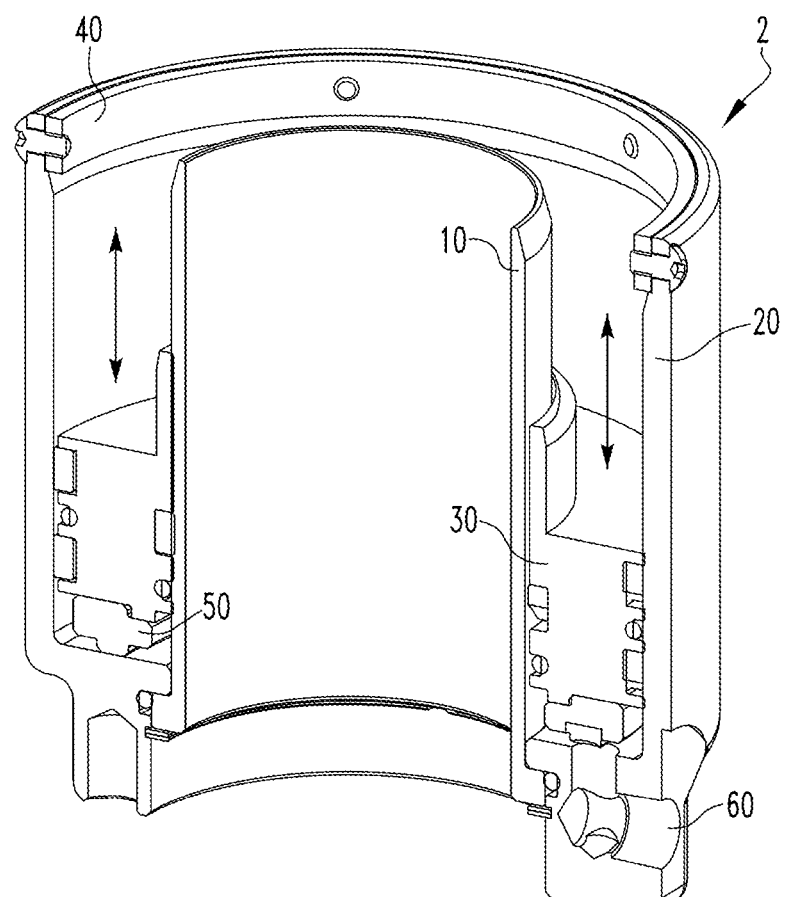
FIG. 1 is an isometric sectional view of a portion of an adjustable coil-spring spacer in accordance with an example embodiment of the present invention.
Figure 2:
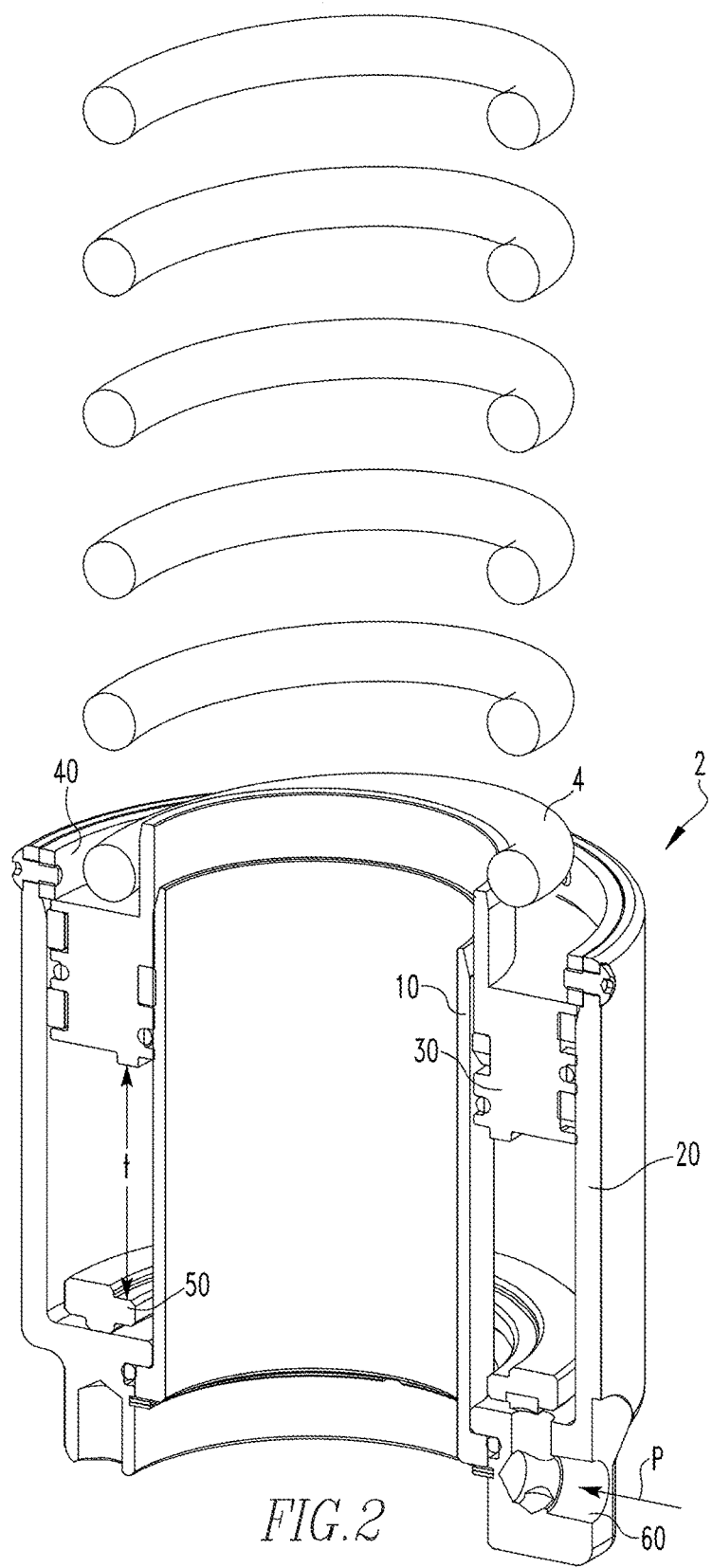
FIG. 2 is an isometric sectional view of the adjustable coil-spring spacer of FIG. 1 shown in a pressurized state, high ride height setting shown with a coil-spring (also shown in section) engaged therewith.

An example embodiment of a coil-spring spacer 2 in accordance with the present invention will now be described in conjunction with the aforementioned FIGS. 1-3. Referring first to the sectional view of FIG. 1, spacer 2 has a central locating sleeve 10 which is positioned and structured to surround the shock absorber (not shown) and locate the spacer 2 axially with the suspension spring (e.g., such as coil spring 4 shown in FIGS. 2 and 3). Combining the sleeve 10 and an outer cylinder housing 20 provides the annular area for a main piston 30 to slide (in either of the directions of the arrows in FIG. 1) and seal on an inner portion against sleeve 10 and on an outer portion against an inner surface of cylinder housing 20. Main piston 30 is positioned and structured to engage a coil spring 4. Between sleeve 10 and outer cylinder housing 20, and below main piston 30 is thus defined a space having a variable volume (e.g., by moving piston 30) which may be selectively pressurized pneumatically or hydraulically. A hard stop 40 sets the main piston 30 pressurized travel limit (i.e., when the spacer 2 is at its greatest thickness, such as shown in FIG. 2). Below the main piston 30 is one version of a spacer 50 which serves two functions, to limit low pressure main piston travel (i.e., when the spacer 2 is at its minimum thickness, such as shown in FIG. 3) and to provide enough structural support while allowing for increased main piston surface area seen by the pressurized air or oil to lift the piston 30 from the lowest position while under load from the main suspension spring.

FIG. 2 shows the spacer 2 in its pressurized state (i.e., which raises the ride height of the chassis). In its pressurized state, pressurized air or oil enters spacer 2 via a port 60 (such as shown by the arrow P) which acts on the bottom face of the main piston 30 to raise it up to the hard stop 40 (and thus raise spring 4). The hard stop position may be adjustable and the pressure of the air or oil acting on main piston 30 is sufficient enough so as to not contribute to the spring rate of the suspension. The amount of available (downward) travel of main piston 30 is indicated by the distance t.

Figure 3:
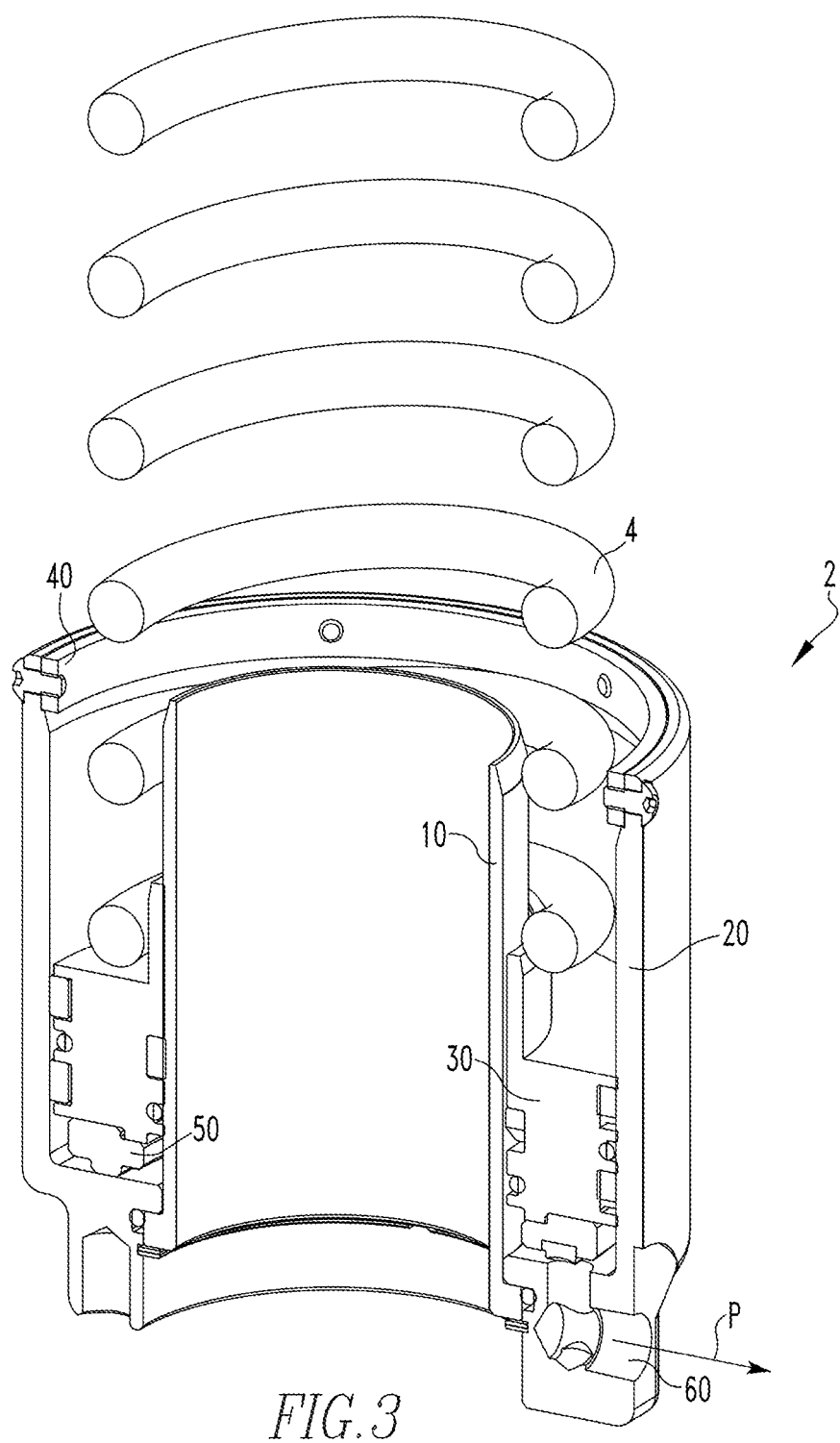
FIG. 3 is an isometric section view of the adjustable coil-spring spacer of FIG. 1 shown in a depressurized state, low ride height setting shown with a coil-spring (also shown in section) engaged therewith.

FIG. 3 shows the spacer 2 in its depressurized state (i.e., which lowers the ride height of the chassis). In its depressurized state, the pressurized air or oil has been forced out of the device by the main spring force, thereby allowing the main piston to slide down the annulus until it contacts the bottom spacer 50. The spring 4 is typically inside the cylinder housing 20 at this point and the suspension has been lowered by the distance equal to the vertical displacement of the piston (i.e., the distance t shown in FIG. 2).

The change in pressure inside the device is typically triggered by a timer which sends a signal to open a valve to release the pressure. This electrical signal can also be triggered by a sensor on the chassis, suspension. ECU, and driver. The rate of depressurization can be tunable.

It is to be appreciated that as an alternative to the particular example described herein, a similar arrangement comprised of a piston and cylinder which is co-axially located with the shock absorber which is mounted to the shock absorbers main body, body cap, shaft, eyelet, or suspension member may be employed without varying from the scope of the present invention. It is also to be appreciated that embodiments of the present invention may be mounted to the sprung or unsprung mass of a vehicle with the main suspension spring mounted to the opposite without the shock absorber being co-axial.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

The invention claimed is:

1. An adjustable coil spring spacer comprising:
   a central locating sleeve which is positioned and structured to surround a shock absorber and locate the spacer axially with a suspension spring;
   an outer cylinder housing;
   an annular wall extending between the central locating sleeve and the outer cylinder housing;
   a piston disposed between the central locating sleeve and the outer cylinder housing which is structured to engage the suspension spring; and
   a spacing element disposed between the annular wall and the piston,
   wherein the piston is slidable between:
      a first position with respect to the central locating sleeve and the outer cylinder housing; and
      a second position with respect to the central locating sleeve and the outer cylinder housing, wherein the second position is spaced a pre-determined distance from the first position, and
   wherein the spacing element is positioned and structured to set a minimum spacing between the piston and the annular wall.

2. The adjustable coil spring spacer of claim 1, wherein when disposed in the first position a portion of the piston is in engagement with a hard stop.

3. The adjustable coil spring spacer of claim 1, wherein the piston is slidable between the first position and the second position by applying or removing a force to a face of the piston opposite a portion which is structured to engage the suspension spring.

4. The adjustable coil spring spacer of claim 3, wherein the force is a hydraulic pressure.

5. The adjustable coil spring spacer of claim 3, wherein the force is a pneumatic pressure.

6. A vehicle comprising a suspension system including the adjustable coil spring spacer of claim 1, wherein when the piston is disposed in the first position the vehicle has a first ride height, and wherein when the piston is disposed in the second position the vehicle has a second ride height different than the first ride height.

7. The adjustable coil spring spacer of claim 1, wherein the spacing element comprises an independent ring member disposed between the central locating sleeve and the outer cylinder housing.

8. The adjustable coil spring spacer of claim 1, wherein the piston comprises a surface which faces the annular wall and wherein the spacing element comprises a portion of the piston which extends away from the surface toward the annular wall.

9. A method for passively adjusting a ride height of a vehicle using an adjustable coil spring spacer, the adjustable coil spring spacer comprising:
   a central locating sleeve which is positioned and structured to surround a shock absorber and locate the spacer axially with a suspension spring;
   an outer cylinder housing;
   an annular wall extending between the central locating sleeve and the outer cylinder housing:
   a piston disposed between the central locating sleeve and the outer cylinder housing which is structured to engage the suspension springs, and
   a spacing element disposed between the annular wall and the piston;
   wherein the piston is slidable between:
      a first position with respect to the central locating sleeve and the outer cylinder housing; and
      a second position with respect to the central locating sleeve and the outer cylinder housing, wherein the second position is spaced a pre-determined distance from the first position, and
   wherein the spacing element is positioned and structured to set a minimum spacing between the piston and the annular wall;
   the method comprising:
   relieving a force on a portion of the piston positioned in a suspension of the vehicle upon the occurrence of a predetermined event.

10. The method of claim 9, wherein relieving a force on a portion of the piston comprises relieving an hydraulic pressure.

11. The method of claim 9, wherein relieving a force on a portion of the piston comprises relieving a pneumatic pressure.

12. The method of claim 9, wherein the predetermined event comprises elapse of a predetermined time.

13. The method of claim 9, wherein the predetermined event comprises a signal from one of: a chassis, a suspension, or an ECU of the vehicle.

* * * * *